United States Patent
Anand et al.

(10) Patent No.: US 9,365,932 B2
(45) Date of Patent: Jun. 14, 2016

(54) EROSION AND CORROSION RESISTANT COATINGS FOR EXHAUST GAS RECIRCULATION BASED GAS TURBINES

(75) Inventors: Krishnamurthy Anand, Bangalore (IN); Yuk-Chiu Lau, Ballston Lake, NY (US); Paul Mathew, Karnataka (IN); Surinder Singh Pabla, Greer, SC (US); Guruprasad Sundararajan, Karnataka (IN); Mohandas Nayak, Karnataka (IN)

(73) Assignee: General Electric Company, Schenectady, NY (US)

(*) Notice: Subject to any disclaimer, the term of this patent is extended or adjusted under 35 U.S.C. 154(b) by 1030 days.

(21) Appl. No.: 13/528,149

(22) Filed: Jun. 20, 2012

(65) Prior Publication Data

US 2013/0340403 A1    Dec. 26, 2013

(51) Int. Cl.
*C23C 30/00*   (2006.01)
*F01D 5/28*    (2006.01)

(52) U.S. Cl.
CPC ............ *C23C 30/00* (2013.01); *F01D 5/288* (2013.01); *F05D 2230/90* (2013.01); *Y02T 50/672* (2013.01); *Y10T 428/12611* (2015.01)

(58) Field of Classification Search
CPC .......... F05D 2260/611; F05D 2260/95; F05D 23/007; Y02E 20/185; F01K 23/10; F02C 3/34; F01D 5/288; C23C 30/00
See application file for complete search history.

(56) References Cited

U.S. PATENT DOCUMENTS 5,428,953 A * 7/1995 Siga .................. C22C 38/44
                                              60/39.182

(Continued)

FOREIGN PATENT DOCUMENTS

| CN | 1143953 C | 3/2004 |
| CN | 101514657 A | 8/2009 |

(Continued)

OTHER PUBLICATIONS

Yu, H. "Influence of Manufacturing Process and Alloying Element Content on the Tribomechanical Properties of Cobalt-Based Alloys." J. Tribol. Journal of Tribology 131.1 (2009): n. pag. Engineering & Physical Sciences—Heriot-Watt University. Heriot-Watt University. Web. Sep. 21, 2015.*

(Continued)

*Primary Examiner* — Phutthiwat Wongwian
*Assistant Examiner* — Stefan Ibroni
(74) *Attorney, Agent, or Firm* — McNees Wallace & Nurick, LLC

(57) ABSTRACT

A compressor blade for use in a compressor section of a gas turbine engine, comprising: a martensitic stainless steel compressor blade and an abrasive coating having an anodic component. The compressor blade has a blade portion, a dovetail portion and a platform portion intermediate the blade portion and the dovetail portion, the blade portion terminating in a tip opposite the dovetail portion. A cobalt-based coating overlies at least the blade portion of the compressor blade. The cobalt-based coating comprises a cobalt based material that includes precipitates of tungsten carbide that provide erosion resistance and particles of a sacrificial metal-based material distributed through the cobalt-based coating that provide galvanic corrosion resistance to the system.

30 Claims, 2 Drawing Sheets

(56) References Cited

U.S. PATENT DOCUMENTS

| | | | |
|---|---|---|---|
| 6,180,259 B1* | 1/2001 | Harada | C23C 4/02 427/453 |
| 6,256,976 B1* | 7/2001 | Kataoka | F02C 3/305 60/39.52 |
| 8,051,638 B2 | 11/2011 | Aljabar et al. | |
| 2008/0309087 A1* | 12/2008 | Evulet | F02C 3/34 290/52 |
| 2009/0297720 A1* | 12/2009 | Ramgopal | C23C 4/06 427/455 |
| 2010/0086398 A1 | 4/2010 | Ochiai et al. | |
| 2010/0226783 A1 | 9/2010 | Lipkin et al. | |
| 2011/0165433 A1 | 7/2011 | Pabla et al. | |
| 2012/0114496 A1 | 5/2012 | Oikawa et al. | |

FOREIGN PATENT DOCUMENTS

| | | |
|---|---|---|
| CN | 102465240 A | 5/2012 |
| JP | 1082306 A | 3/1998 |
| JP | 2005232575 A | 9/2005 |

OTHER PUBLICATIONS

Carpenter, Technical Datasheet—Custom 450 Stainless, www.cartech.com, Aug. 1, 1994 retrieved Sep. 17, 2015.*

Deloro Stellite, Wrought Products Technical Data—Stellite 6B, stellite.com, Jun. 13, 2011 via archive.org retrieved Sep. 17, 2015.*

Search Report and Written Opinion from corresponding EP Application No. 13172911.3-1362 dated Oct. 7, 2013.

Unofficial English Translation of Chinese Office Action issued in connection with corresponding CN Application No. 201310245847.1 on Sep. 11, 2015.

* cited by examiner

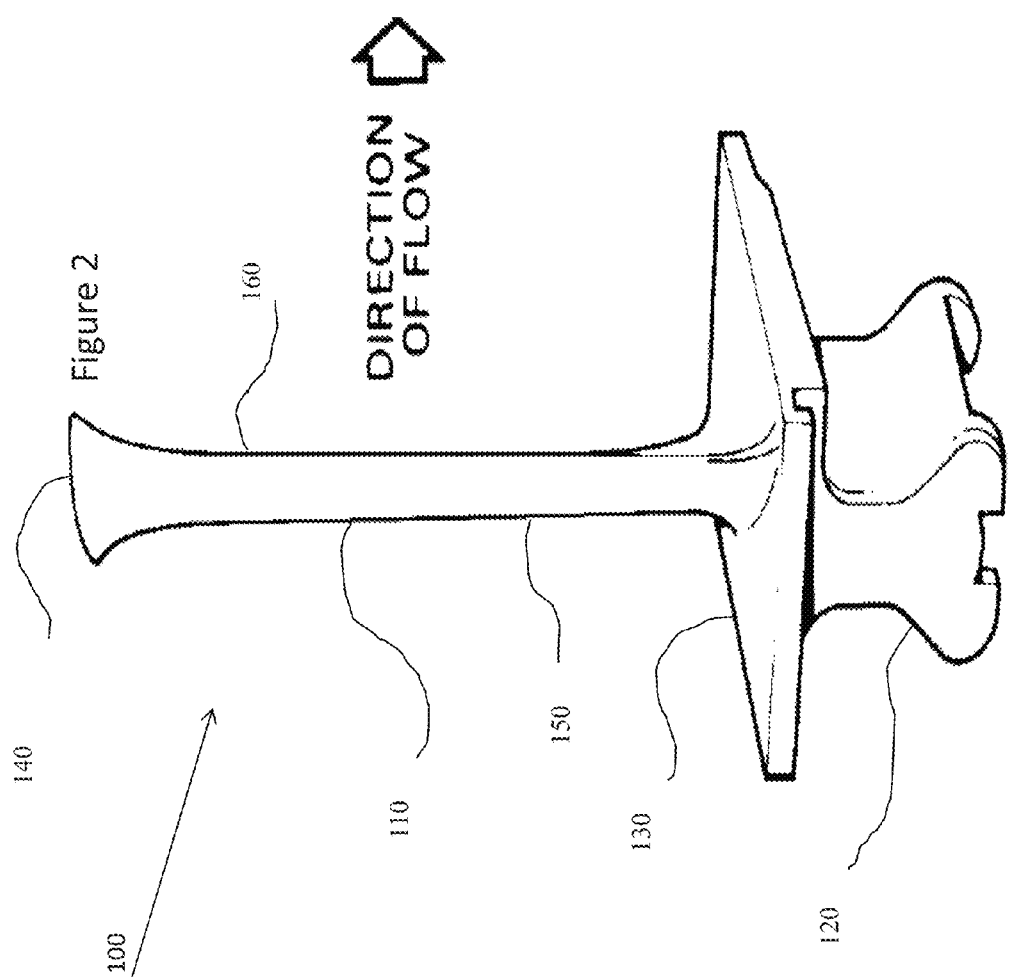

EROSION AND CORROSION RESISTANT COATINGS FOR EXHAUST GAS RECIRCULATION BASED GAS TURBINES

FIELD OF THE INVENTION

The present invention is directed to a coating for use over a rotating blade, and more specifically, to an improved coating for use over a compressor blade subject to erosion, abrasion and galvanic corrosion.

BACKGROUND OF THE INVENTION

In an axial flow gas turbine engine, air is drawn into the front of the engine, compressed by a shaft-mounted compressor, and mixed with fuel. The mixture is burned, and the hot gases of combustion are passed through turbines mounted on the same shaft. The flow of combustion gas turns the turbine, and the rotating turbine extracts energy from the flow of the combustion gas which can be converted to electricity and turns the shaft that powers the compressor. The expended exhaust gases may be exhausted to the atmosphere.

The compressor blades used in turbine applications for land-based turbines are usually made of 400 Series stainless steel. These steels are usually sufficiently strong for the purpose, but are subject to erosion and corrosion mechanisms, by nature of their operation which involves compressing large volumes of air, which air may include contaminants. Contaminants found in air include, but are not limited to, unwanted oxides, carbon dioxide, chlorides (salt), $SO_2$, $SO_3$, sulfate-based salts, sulfides dirt, and organic impurities. Dirt includes sand, volcanic ash, fly ash, cement, dust and even substrate impurities.

To improve the erosion and abrasion behavior of compressor blades, an erosion-resistant or abrasion-resistant coating may be applied over the airfoil portion of the blade, which is exposed to the large volumes of air on which is compressed. Frequently, these coatings may be limited to the airfoil leading edge and tip. The coatings are usually cobalt-based alloys having some tungsten (W) and carbon (C) to facilitate the formation of WC/Co particles that enhance the erosion and abrasion resistance of the coating.

These stainless steel blades coated with abrasion-resistant cobalt-based alloys still may be subject to attack simply as a result of the environment in which they are used. The blades may be subject to galvanic corrosion when used in an environment which may be acidic. This may result from the gas turbine being placed in an ocean atmosphere or even in proximity to a nearby chemical plant, such as a chemical petroleum plant or refinery. The chemicals from these environments as well as the other contaminants found in air may combine with moisture in the air to produce a corrosive environment. Also, many modern gas turbine engines may introduce moisture by use of an on-line wash system that provides operational cleaning of the blades, or fogging and/or evaporator systems to enhance compressor efficiency. These systems may combine with contaminants or environmental chemicals to produce a corrosive environment. In addition, green initiatives suggest exhaust gas recirculation of at least of portion of exhaust gases captured by the exhaust gas recapture system to reduce $CO_2$ emissions. Such exhaust gas recapture systems include stoichiometric—cooled exhaust gas recirculation, or SEGR. The recirculation of exhaust gas by introducing it into combustion air will increase the concentration of chemicals forming a corrosive environment to which the compressor blades are exposed. Current coatings and materials combinations can be vulnerable, especially when the SEGR gas path contains contaminants such as $SO_2$.

While the stainless steel compressor blades coated with a cobalt-based abrasion-resistant alloy exhibit good erosion and abrasion resistance, compressor blades, such as compressor blades formed from a martensitic stainless steel such as GTD-450 and coated with a cobalt-based coating such as STELLITE® are subject to galvanic corrosion in a corrosive environment, which is even more severe in a SEGR mode. In such an environment, the compressor blades may be subject to crevice corrosion or pitting. The cobalt-based coating tends to be cathodic with respect to the compressor blade base material. As a result, galvanic corrosion will occur in the presence of the corrosive media as concentration cells are set up in crevices or recesses where deposits of contamination or corrosion product are trapped and become stagnant. Crevice corrosion may occur in these regions. Pitting corrosion also may occur as small pits or holes form in the coating where deposits of contamination form. These pits may initially develop from impacts with foreign objects and contaminants drawn into the gas turbine. These impacts dent the coating and enable corrosive media to collect. What is needed is a coating for use over stainless steel compressor blades in which the coating maintains the characteristics of erosion and abrasion resistance, and protect the base metal from galvanic or dissimilar metal corrosion in the case of ingress of corrosive species through a breach in the coating caused by erosion or other damage.

SUMMARY OF THE INVENTION

A wear component, comprising a martensitic stainless steel base material and a cobalt-based wear coating overlying the martensitic stainless steel base material. The cobalt-based wear coating comprises a cobalt based alloy that includes precipitates of tungsten carbide. The cobalt-based wear coating further includes particles of a sacrificial metal-based material distributed through the cobalt-based coating. The sacrificial material acts as an anode to prevent galvanic corrosion of the base material in a corrosive environment.

The corrosion resistance and corrosion performance of a cobalt-based matrix coating finds particular use on compressor blades in a gas turbine, which is enhanced by the addition of particles of metal-based compounds and oxide materials that are anodic or sacrificial with respect to the cobalt-based material. The added particulates of reactive metal act as anodes when a compressor blade is coated with the coating and exposed to a corrosive environment.

A compressor blade for use in a compressor section of a gas turbine engine comprises a martensitic stainless steel compressor blade. The compressor blade includes a blade portion, a dovetail portion and a platform portion intermediate the blade portion and the dovetail portion. The blade portion terminates in a tip opposite the dovetail portion. A cobalt-based coating overlies at least the blade portion. The cobalt-based coating comprises a cobalt-based material that includes precipitates of tungsten carbide and particulates of sacrificial compounds such as NiO and/or $Cr_2O_3$, uniformly distributed through the cobalt-based coating. Any other uniformly distributed particles that undergo redox reactions at a potential which is anodic with respect to the stainless steel matrix are also suitable for use in this application.

The reactive metal included in the cobalt-based coating acts as an anode to prevent galvanic corrosion of the compressor blade, such as by crevice corrosion or pitting, when the compressor blade is exposed to a corrosive atmosphere.

A coating that includes a reactive metal as a sacrificial anodic material allows for the compressor blade to operate without experiencing corrosion in hostile environments such as in proximity to the ocean or to a chemical plant, or in hostile environments created by the design of the gas turbine, such as designs that include exhaust gas recirculation and on-line water washing or fogging/evaporate cooler systems.

Another advantage of applying such coatings to compressor blades is reduced maintenance time to replace/recoat the blades, which increases the duty of the gas turbine engine.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 2 is a front perspective view of a typical compressor blade used in an axial gas turbine unit.

DETAILED DESCRIPTION OF THE INVENTION

Figure 1:
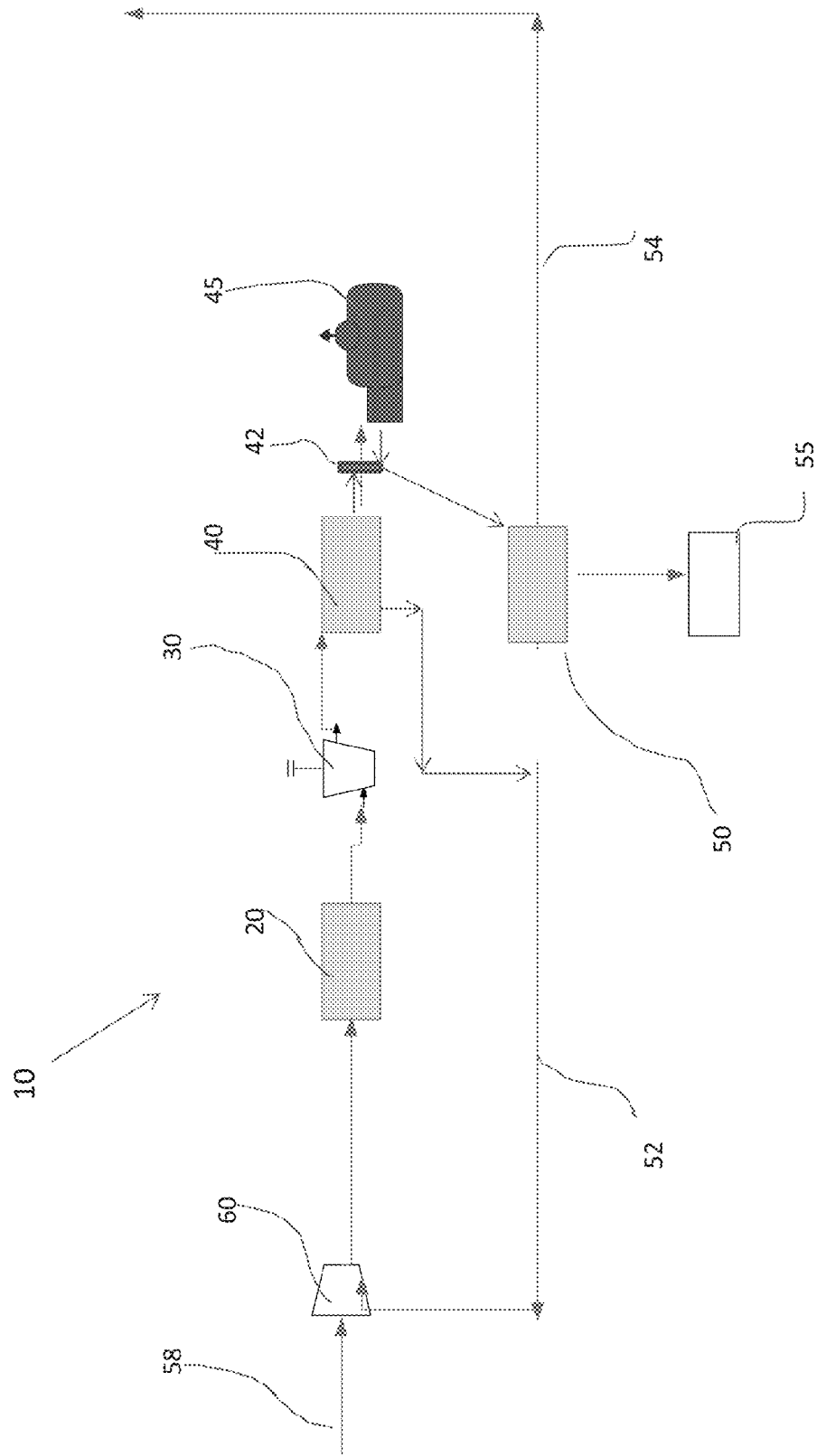
FIG. 1 is a schematic diagram of an exhaust gas recirculation system that recycles a portion of the exhaust gas back to the compressor.

Compressor blades for use in the compressor section of land-based gas turbines normally comprise a corrosion-resistant steel, such as any of the well-known 400 series martensitic stainless steels. One such martensitic steel alloy particularly suitable for use in compressor blades is GTD-450, a precipitation-hardened steel, having a nominal composition of 15.5% Cr, 6.3% Ni, 1.5% Cu, 0.37% Nb, 0.05% C and the balance essentially Fe. As used herein, the term "balance essentially Fe" or "balance of the alloy essentially Fe" is used to include, in addition to iron, small amounts of impurities and other incidental elements that are inherent in martensitic steel alloys, which in character and/or amount do not affect the advantageous aspects of the alloy. Unless otherwise specified, all alloy compositions disclosed herein are provided in weight percent. While compressor blades such as GTD-450 offer excellent strength, they are still subject to erosion and abrasion.

To improve the corrosion, erosion and abrasion performance of martensitic steel alloy blades, the alloys are coated with a wear-resistant alloy such as STELLITE® 6. The nominal composition of the STELLITE® 6, a cobalt-based alloy, in weight percent, is 0.9-1.4% C, 28-32% Cr, 3.5-5.5% W, up to 3% Ni, up to 1.5% Mo, up to 3.0% Fe, up to 2% Mn, up to 2% Co and the balance essentially Co. As used herein, the term "balance essentially cobalt" or "balance of the alloy essentially cobalt" is used to include, in addition to cobalt, small amounts of impurities and other incidental elements that are inherent in STELLITE® 6, which in character and/or amount do not affect the advantageous aspects of the alloy. Other coating materials may include Triballoy 400, a Laves phase strengthened Co-based alloy having a nominal composition of 28% Mn, 9% Cr, 2.6% Si, 0.04% C and the balance Co and modified tungsten carbide compositions such as WC having 10% co and 4% Cr. However, the martensitic steel compressor blade such as GTD-450, precipitation-hardened to form Cu precipitates in a martensitic matrix alloy coated with a cobalt-based alloy such as STELLITE® 6, while having excellent abrasion and wear resistance, is subject to galvanic corrosion when exposed to long-term acidic environments.

Land-based gas turbines can be subjected to such corrosive environments as a result of normal operations. For example, on-line water wash systems can provide conditions amenable to water droplet erosion and corrosion pitting. Normal operations in a highly corrosive environment such as near a chemical petroleum environment or in proximity to an ocean coastline also may contribute to corrosion. More recently, exhaust gas recirculation has resulted in exposure of turbine blades to higher concentrations of $CO_2$, $SO_2$ and $H_2O$. While such exhaust gas recirculation is effective in reducing $CO_2$ emissions from gas turbines, it does lead to galvanic corrosion in compressor blades. The gas turbine having an exhaust gas recirculation system 10 is depicted in FIG. 1. Fuel is combined with compressed air in combustor section 20 where combustion of fuel occurs. Hot gases of combustion pass from combustor section 20 and flow through turbine section 30, also referred to as a stoichiometric exhaust gas recirculation (SEGR) gas turbine section, where power in the form of electricity is generated. Exhaust gases are then passed through the exhaust portion 40 of the gas turbine. Some of the exhaust gases from turbine section 30 (or turbine section 30 and exhaust portion 40 are recycled along recirculation line 52 to axial flow compressor 60 where the exhaust gas is combined with air (or other oxidant) input from static air input 58. The compressor portion 60 combines and compresses the exhaust gas from recirculation line 52 and the air (or other oxidant) from static air input 58 and delivers the compressed fluid to combustor section 20 to support combustion, as set forth above.

The remaining exhaust gases next pass through a heat recovery device 42 such as a heat exchanger for use with a heat recovery steam generator (HRSG) 45 where additional heat is recovered and used to generate steam in heat recovery steam generator 45. Exhaust gases then pass to a scrubbing system 50 where they are scrubbed of contaminants. The $CO_2$ exhaust gases pass through to a $CO_2$ recapture system 55, where $CO_2$ is recaptured for either storage or other use, while some of the remaining gases are exhausted through exhaust line passageway 54 to the atmosphere.

Compressor 60 combines and compresses the exhaust gas from recirculation line 52 and the air from static air input 58 (and other oxidants) and delivers the compressed fluid to combustor section 20 to support combustion, as set forth above.

The recirculated exhaust gas passing from exhaust portion 40 and returned to compressor 60, has a temperature in the range of about 100-120° F. and a nominal composition in volume fraction as set forth in Table 1, below.

TABLE 1

Nominal Recirculated Exhaust Gas Composition

| Gas | Nominal Composition by Volume | Preferred Composition by Volume |
| --- | --- | --- |
| $N_2$ | 72-84% | Balance |
| $O_2$ | 5 ppm max. | 0.0004% |
| $CO_2$ | 15% max. | 9.93% ± 0.5% |
| Ar | 2% max. | 0.89% ± 0.2% |
| $H_2O$ | 16% max. | 13.71% ± 2% |
| CO | 1% max. | 0.53% ± 0.1% |
| $H_2$ | 0.5% max. | 0.22% ± 0.01% |
| NO | 50 ppm max. | 0.0017% ± 0.0002% |
| $CH_4$ | 1 ppm max. | 0.00001% max. |
| SO2 | 1 ppm max. | trace |

The resulting exhaust gas returning to compressor 60 provides compressed fluid to SEGR combustor section 30 includes an enhanced concentration of $CO_2$, but this enhanced concentration of $CO_2$ does not otherwise affect combustion. The resulting combustion fluid passing from combustor section 20 to SEGR turbine section 30 to exhaust potion 40 includes a higher concentration of $CO_2$, which is easier to capture and sequester, so that it is not released to the environment.

As previously discussed, the compressor blades normally comprise a corrosion-resistant steel, such as any of the well-known 400 series martensitic stainless steels. One such martensitic steel alloy used for compressor blades is GTD-450, a precipitation-hardened steel, having a nominal composition of 15.5% Cr, 6.3% Ni, 1.5% Cu, 0.37% Nb, 0.05% C and the balance essentially Fe. As used herein, the term "balance essentially Fe" or "balance of the alloy essentially Fe" is used to include, in addition to iron, small amounts of impurities and other incidental elements that are inherent in martensitic steel alloys, which in character and/or amount do not affect the advantageous aspects of the alloy. Unless otherwise specified, all alloy compositions disclosed herein are provided in weight percent. Other stainless steels used for compressor blade applications include 403 stainless having a nominal composition of 12% Cr, 0.11 C max and the balance essentially Fe; 403 Cb stainless steel having a nominal composition of 12% Cr, 0.2% Nb (Cb), 0.15 C and the balance essentially Fe; 15-5 PH having a nominal composition of 15% Cr, 4.5% Ni, 3.5% Cu, 0.3% Nb, 0.07% C and the balance essentially Fe; and, 17-4 PH having a nominal composition of 16.5% Cr, 4.25% Ni, 3.6% Cu, 0.25% Nb, 0.04% C and the balance essentially Fe. While compressor blades such as GTD-450 stainless steel offer excellent strength, they are still subject to erosion and abrasion.

To improve the erosion and abrasion performance of martensitic steel alloy blades, the alloys are coated with a wear-resistant alloy such as STELLITE® 6. The blades are subject to impact from foreign objects in the air, such as dust, sand particles, pebbles, and other airborne particles that can damage the surface of the coatings penetrating through even to the stainless steel base material. The nominal composition of the STELLITE® 6, a cobalt-based alloy, in weight percent, is 0.9-1.4% C, 28-32% Cr, 3.5-5.5% W, up to 3% Ni, up to 1.5% Mo, up to 3.0% Fe, up to 2% Mn, up to 2% Co and the balance essentially Co. As used herein, the term "balance essentially cobalt" or "balance of the alloy essentially cobalt" is used to include, in addition to cobalt, small amounts of impurities and other incidental elements that are inherent in STELLITE® 6, which in character and/or amount do not affect the advantageous aspects of the alloy. STELLITE® 6 is characterized by good abrasion and erosion resistance. However, cobalt-based alloys such as STELLITE® 6, while having excellent abrasion and wear resistance, are subject to deterioration when exposed to long-term acidic environments in areas where the coating has been penetrated either as a result of damage or at any other exposed interface between the coating and the underlying base material.

Acidic or corrosive chemicals in the environment can result from proximity of a gas turbine to the ocean or to a chemical plant such as a chemical petroleum plant. Furthermore, gas turbine design can contribute to corrosive environments for compressor blades by providing water or water vapor in the form of steam when the gas turbine design includes one or more of an on-line water wash system, fogging and/or evaporator cooler system and exhaust gas recirculation system. Water or water vapor combines with available chemicals to provide an electrolytic solution that promotes galvanic corrosion.

A compressor blade for a gas turbine that increases the longevity of the blade by avoiding galvanic corrosion, such as, for example, crevice corrosion or pitting, comprises a martensitic stainless steel base material. The compressor blade 100 is depicted in FIG. 2. Compressor blade 100 comprises a blade portion 110, a dovetail portion 120 and a platform portion 130 positioned intermediate between blade portion 110 and dovetail portion 120. A tip portion 140 extends from blade portion 110 opposite dovetail portion 120. Blade portion 110 has a leading edge 150 and a trailing edge 160. While any martensitic or precipitation-hardened stainless steel base material may be used for compressor blade 100, a preferred martensitic stainless steel material includes precipitates of FeC. GTD-450 stainless is a preferred martensitic stainless steel material for use as compressor blade 100.

In order to reduce the galvanic potential of the compressor blade base material, a modified erosion resistant and abrasion resistant coating is applied to the blade. This coating comprises a cobalt-based alloy having precipitates of WC and more sacrificial element-based particles, such as NiO, $Cr_2O_3$ and $Al_2O_3$ particles, hereinafter referred to as sacrificial particles. The sacrificial particles are distributed through the coating. Because the added sacrificial particles are more reactive than the martensitic stainless steel in an electrolytic environment, the sacrificial particles, such as NiO particles, act as anodes in the galvanic system and become sacrificial. Electrons are transferred from the anodic material, that is, the current flow is from the anodic material, so that the anodic material is sacrificed at the expense of other materials in the system. Thus, in this alloy system comprising the martensitic base material and the cobalt-based coating, sacrificial particles, such as NiO, are anodic while the compressor blade base metal (martensitic stainless steel) becomes cathodic. It is desirable for the coating or a component of the coating to be anodic, as it then becomes the sacrificial material in a system when it is exposed to a corrosive environment. So in the corrosive environment encountered, such as due to the increased concentration of $SO_2$ and other contaminants in systems utilizing exhaust gas recirculation where there is also water or water vapor present, a coating having a sacrificial component, such as a cobalt-based alloy having sacrificial particles distributed throughout the matrix provides protection to the compressor blade and prevents premature galvanic corrosion of the compressor blade. Only those metal-based compounds (such as oxides) whose electrochemical REDOX potential are anodic with respect to the martensitic base material, GTD-450, may be used as sacrificial compounds. Nickel oxide, NiO, is the preferred particle oxide. Other useful sacrificial materials include cerium oxide, aluminum oxide ($Al_2O_3$) and chromium oxide ($Cr_2O_3$), in which cerium oxide, $Al_2O_3$ and/or $Cr_2O_3$ is/are included in the coating either in combination with NiO or as a substitute for NiO.

The anodic material may be added as a powder to a cobalt-based coating powder and thoroughly mixed with the cobalt based coating powder. As previously noted, while any cobalt-based material that will form precipitates of WC/Co may be used, preferred cobalt-based materials include STELLITE® 6 and Triballoy 400. The sacrificial particles, preferably NiO, are mixed with powders of the cobalt-based materials so that the sacrificial particles comprise a sufficient volume fraction within the coating to sustain the anodic reaction so as to prevent galvanic corrosion of the base material, but not so much as to compromise the inherent erosion/abrasion resistance of the cobalt-based alloy. About 5-35% in volume fraction of the sacrificial particles or powders, the balance of the material being the cobalt-based material provides the proper balance between erosion resistance and galvanic protection in the coating material. A preferred volume fraction is 10-30% sacrificial particles. The sacrificial particles are provided in a size range of from about 10 nanometers to about 2 microns. The sacrificial particles are thoroughly mixed so that the sacrificial particles are substantially uniformly distributed through the cobalt-based material powder. The sacrificial particles while providing anodicity should not impede the primary function of a coating such as STELLITE®—which is to provide wear protection. To accomplish the above objectives, the volume fraction of sacrificial particles should be sufficient to provide the galvanic current throughput to sustain local galvanic protection. The sacrificial particles need to be sized in such a way that they do not impede the wear resistance of the coating. If the sacrificial particles are too large, then their brittle, frangible nature may result in the particles being preferentially removed. However if their sizes are smaller, then the damage zone induced by impacting particles or water droplets, then the material response will be dominated by the wear coating rather than by individual large sacrificial particles. The sacrificial particles, particulates or powder preferably have a particle size distribution between 100 nanometers and 2000 nanometers. The sacrificial particles further comprise a volume fraction of at least about 15% of the coating. More preferably, the sacrificial particles further comprise a volume fraction from about 15% to about 25% of the coating.

After the particles have been thoroughly mixed to provide a substantially uniform dispersion of anodic particulates in the cobalt-based material coating powder, the powder composition may be applied to the stainless steel compressor blade by any suitable method.

Alternatively, after mixing, the particles may be crushed. The crushed particles can be spray dried and sintered or simply sintered to produce powder agglomerates of anodic powder+cobalt-based powder having a size of 5-30 microns. The agglomerates can be screened to provide this size distribution or any other desired size distribution, as required. Referring again to FIG. 2, the powder composition should be applied to at least leading edge 150 of compressor blade 100, preferably from tip portion 140 to platform portion 130. More preferably, the powder composition should be applied to blade portion 110 of compressor blade 100 including leading edge 150, trailing edge 160 and tip portion 140. Most preferably, the powder composition should be applied to blade portion 110 and platform portion 130. It is not necessary to coat dovetail portion 120 of blade 100 with STELLITE® 6 as it is normally not exposed to the erosive, corrosive atmosphere that the portions of blade 100 above platform portion 130 are exposed to.

The composition of anodic powder material +cobalt-based powder material may be applied by any known technique. Well-known techniques for application of the powder by spraying onto the substrate include high velocity oxy fuel (HVOF) spray, high velocity air fuel (HVAF) spray, cold spray, detonation spray or suspension thermal spray. The same parameters used to apply STELLITE® 6 may be used to apply the STELLITE® 6 modified with NiO particles as described above.

The coating may be applied to the affected areas of the compressor blade, as described above to a sufficient thickness to protect the substrate material from erosion during its life, typically from about 0.2-2 mils thick. These thicknesses are suitable to also provide protection from galvanic corrosion. The as-deposited coating has the traditional STELLITE® 6 microstructure comprising complex wear resistant particles that include tungsten carbide in a ductile cobalt chromium alloy matrix in addition to substantially uniformly dispersed NiO particles. If desired a top-coat of TiN may be applied over the coated compressor blade by well-known physical vapor deposition (PVD) techniques, if desired.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A wear component, comprising:
   a martensitic stainless steel base material; and
   a cobalt-based wear coating overlying the martensitic stainless steel base material, wherein the cobalt-based wear coating comprises a cobalt based alloy that includes precipitates of tungsten carbide;
   wherein the cobalt-based wear coating further includes particles of a sacrificial metal-based material comprising NiO distributed through the cobalt-based coating; and
   wherein the sacrificial metal-based material acts as an anode to prevent galvanic corrosion of the martensitic stainless steel base material in a corrosive environment.

2. The wear component of claim 1 wherein the cobalt-based alloy overlying the martensitic stainless steel wear component further comprises an alloy having a nominal composition of, in weight percent, 0.9-1.4% C, 28-32% Cr, 3.5-5.5% W, up to 3% Ni, up to 1.5% Mo, up to 3.0% Fe, up to 2% Mn, and the balance essentially Co.

3. The wear component of claim 1 wherein the particles of the sacrificial metal-based material distributed through the cobalt-based coating include particles of the sacrificial material that are more anodic than the martensitic stainless steel comprising the base material, and are substantially uniformly distributed.

4. The wear component of claim 1 wherein the particles further comprise a volume fraction of at least 15%.

5. The wear component of claim 1 wherein the particles have a particle size distribution between 100 nanometers and 2000 nanometers.

6. The wear component of claim 1 wherein the martensitic stainless steel wear component comprises a precipitation-hardenable stainless steel.

7. A compressor blade for use in a compressor section of a gas turbine engine, comprising:
   a martensitic stainless steel compressor blade, the compressor blade having a blade portion, a dovetail portion and a platform portion intermediate the blade portion and the dovetail portion, the blade portion terminating in a tip opposite the dovetail portion;
   a cobalt-based alloy coating overlying the martensitic stainless steel compressor blade, wherein the cobalt-based alloy coating comprises a cobalt based material that includes precipitates of tungsten carbide; and
   particles of a sacrificial metal-based material comprising NiO distributed through the cobalt-based coating.

8. The wear component of claim 1 wherein the particles of the sacrificial metal-based material further comprise a compound selected from the group consisting of cerium oxide, $Cr_2O_3$, $Al_2O_3$, and combinations thereof.

9. The compressor blade of claim 7 wherein the cobalt-based alloy overlying the martensitic stainless steel compressor blade further comprises an alloy having a nominal composition of, in weight percent, 0.9-1.4% C, 28-32% Cr, 3.5-5.5% W, up to 3% Ni, up to 1.5% Mo, up to 3.0% Fe, up to 2% Mn, and the balance essentially Co.

10. The compressor blade of claim 7 wherein the particles of the sacrificial metal-based material distributed through the cobalt-based coating include particles of the sacrificial material that are more anodic than the martensitic stainless steel comprising the compressor blade and are substantially uniformly distributed.

11. The compressor blade of claim 7 wherein the particles further comprise a volume fraction of at least 15%.

12. The compressor blade of claim 11 wherein the particles further comprise a volume fraction from 15% to 25%.

13. The compressor blade of claim 7 wherein the particles have a particle size distribution between 100 nanometers and 2000 nanometers.

14. The compressor blade of claim 7 wherein the martensitic stainless steel compressor blade comprises a precipitation-hardenable stainless steel.

15. The compressor blade of claim 14 wherein the precipitation-hardenable stainless steel has a nominal composition further comprising 15.5% Cr, 6.3% Ni, 1.5% Cu, 0.37% Nb, 0.05% C and the balance essentially Fe.

16. The compressor blade of claim 7 wherein the cobalt-based material having uniformly distributed particles of the sacrificial metal-based material overlies at least the blade portion of the compressor blade.

17. The compressor blade of claim 7 wherein the particles of the sacrificial metal-based material further comprise a compound selected from the group consisting of cerium oxide, $Cr_2O_3$, $Al_2O_3$, and combinations thereof.

18. An exhaust gas recirculation system, comprising:
a combustor section for combusting fuel;
a stoichiometric exhaust gas recirculation turbine section extracting energy from hot gases produced by combusting fuel;
an exhaust portion for receiving hot gases of combustion from the turbine section;
a heat recovery device for receiving at least a portion of the hot gases of combustion from the exhaust portion;
a steam generator for recovering heat from the heat recovery device;
a scrubbing system for scrubbing exhaust gases from the heat recovery device and separating $CO_2$ gases from other gases;
a $CO_2$ recapture system;
an exhaust line passageway for exhausting scrubbed exhaust gases to the atmosphere;
an axial flow compressor in communication with the exhaust portion via an exhaust gas recirculation line and with a static air input for providing compressed fluid to the combustor section for combusting fuel;
wherein the axial flow compressor includes a plurality of martensitic stainless steel compressor blades, each compressor blade further comprising;
a blade portion, a dovetail portion and a platform portion intermediate the blade portion and the dovetail portion, the blade portion terminating in a tip opposite the dovetail portion;
a cobalt-based alloy coating overlying the martensitic stainless steel compressor blade, wherein the cobalt-based coating comprises a cobalt based material that includes precipitates of tungsten carbide; and
particles of a sacrificial metal-based material comprising nickel oxide distributed through the cobalt-based coating.

19. The system of claim 18 further including a source of water.

20. The system of claim 19 wherein exhaust gas from the combustor is recycled through the recirculation line and wherein the exhaust gas is compressed with air from the static air input.

21. The system of claim 19 wherein the recycled exhaust gas has a nominal composition of 5 ppm $O_2$, 15% max $CO_2$, 2% max Ar, 1% max CO, 0.5% max $H_2$, 50 ppm NO, 1 ppm $CH_4$ trace elements of sulfur and the balance $N_2$.

22. The system of claim 18 wherein the martensitic stainless steel compressor blades of the axial flow compressor include the cobalt-based alloy coating further comprising an alloy having a nominal composition of, in weight percent, 0.9-1.4% C, 28-32% Cr, 3.5-5.5% W, up to 3% Ni, up to 1.5% Mo, up to 3.0% Fe, up to 2% Mn, and the balance essentially Co.

23. The system of claim 18 wherein the particles of the sacrificial metal-based material distributed through the cobalt-based coating include particles of a sacrificial material that are more anodic than the martensitic stainless steel comprising the compressor blade.

24. The system of claim 18 wherein each martensitic stainless steel compressor blade further comprises a precipitation-hardenable stainless steel.

25. The system of claim 24 wherein the precipitation-hardenable stainless steel has a nominal composition further comprising 15.5% Cr, 6.3% Ni, 1.5% Cu, 0.37% Nb, 0.05% C and the balance essentially Fe.

26. The system of claim 18 wherein the cobalt-based alloy coating having uniformly distributed particles of the sacrificial metal-based material overlies at least the blade portion of the compressor blade.

27. The system of claim 18 wherein the cobalt-based alloy coating having the uniformly distributed particles of a sacrificial metal-based material overlies the blade portion and the platform portion of the compressor blade.

28. The system of claim 18 wherein the cobalt-based alloy coating having uniformly distributed particulates of the sacrificial metal-based material overlies the at least the leading edge, the trailing edge and the tip portion of the compressor blade.

29. The system of claim 18 wherein the cobalt-based alloy coating overlying the compressor blade is applied to a thickness of 0.2-2 mils.

30. The system of claim 18 wherein the particles of the sacrificial metal-based material further comprise a compound selected from the group consisting of cerium oxide, $Cr_2O_3$, $Al_2O_3$, and combinations thereof.

* * * * *